No. 838,674. PATENTED DEC. 18, 1906.
G. B. WESTBURG.
GAGE.
APPLICATION FILED MAR. 17, 1906.
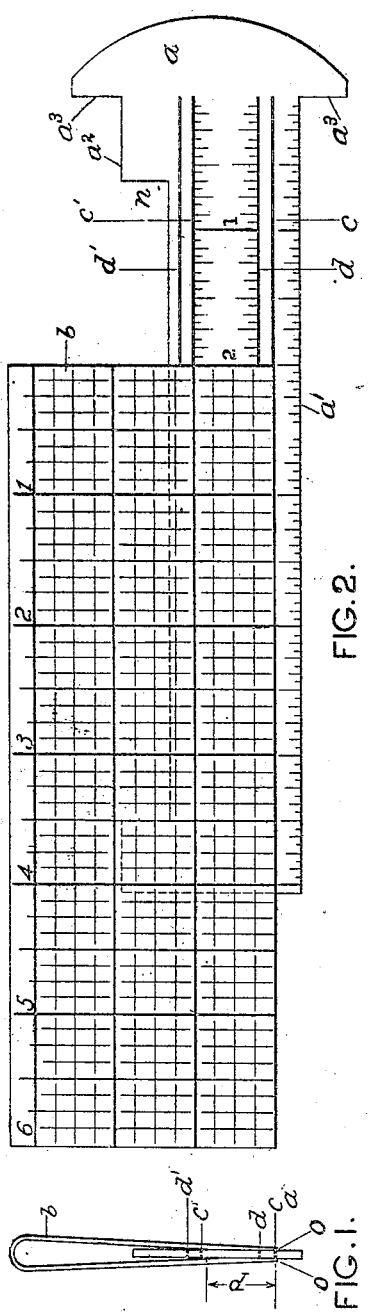
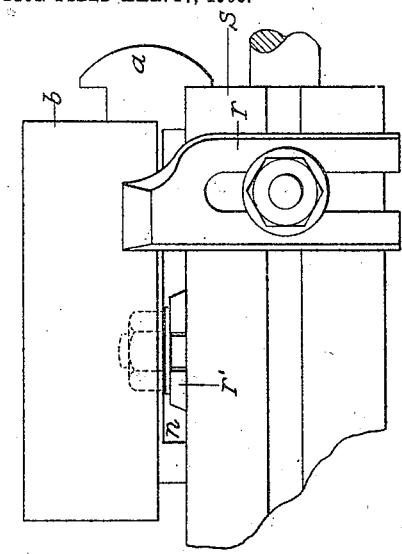
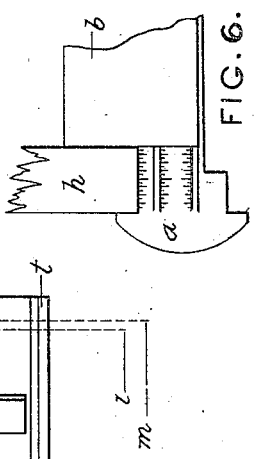
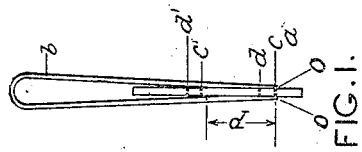
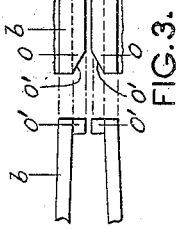
WITNESSES:
INVENTOR
Gustav B. Westburg
BY
L. L. Westfall ATTORNEY

UNITED STATES PATENT OFFICE.

GUSTAV B. WESTBURG, OF SPOKANE, WASHINGTON.

GAGE.

No. 838,674.  Specification of Letters Patent.  Patented Dec. 18, 1906.

Application filed March 17, 1906. Serial No. 306,498.

*To all whom it may concern:*

Be it known that I, GUSTAV B. WESTBURG, a citizen of the United States, residing at Spokane, in the county of Spokane and State of Washington, have invented certain new and useful Improvements in Gages, of which the following is a specification.

This invention relates to gages for setting surface and molding knives on cutter-heads or cylinders.

It has for an object to provide an improved construction by which said knives can be quickly and accurately set.

A further object is to provide a reversible gage applicable for the top, bottom, and side cutters.

A still further object is to provide a gage which is adjustable longitudinally and laterally, so that it may be adapted for various sizes of cutter-heads.

Other objects will appear in the following description and will be more particularly pointed out in the appended claims.

In the drawings, Figure 1 is an end elevation of the invention. Fig. 2 is a side elevation of the device extended. Fig. 3 shows in detail two views of the spring member of the invention. Fig. 4 is a view of the invention applied to a cutter-head with lips. Fig. 5 is a view showing the invention applied to a cutter-head without lips, and Fig. 6 is a view showing the invention employed as a caliper.

Referring more particularly to the drawings, $a$ indicates a member having edges $a'$ $a^2$, either of which may be held squarely against the cutter-head or cylinder, the latter edge $a^2$ being recessed at $n$, so that the edge may rest squarely against a cutter-head or cylinder, such as shown at $s$, Fig. 5, in which the knives $r'$ project rearwardly beyond the cylinder. As shown, the projecting end fits in the recess $n$, and the edge $a^2$ bears against the cylinder on opposite sides of the knife. The member $a$ has the usual projecting shoulder $a^3$ at the end of each edge, the function of the shoulder being to abut the ends of the cutter-heads or cylinders. The member $a$ is provided on opposite sides along its edge $a'$ with an inch scale $c$ and with a scale $c'$ on opposite sides and on its middle part. On each side of the member $a$ between the scale $c'$ and the scale $c$ is located a plurality of grooves $d$, and on the opposite side of the scale $c'$ near the edge $a^2$ grooves $d'$ are located. These grooves $d$ are one-half an inch apart according to the swing scale, as are also the grooves $d'$.

An approximately U-shaped spring member $b$, provided with graduations on opposite sides, one side being graded for cylinders of large diameters and the other side being graded for cylinders of small diameters, has its inner opposed walls provided with a pair of alined ribs $o$, the ends of the ribs being beveled at $o'$ to permit the member $a$ to be easily inserted between the arms of the member $b$, so that the ribs $o$ may be fitted in any two grooves $d$ or $d'$, arranged on opposite sides of the member $a$, as shown in Fig. 1.

The graded member $b$ is used in some instances by itself. It is also used in combination with the member $a$, as shown in Fig. 4, the edge $a'$ being held against the cutter-head and the ribs $o$ being positioned in the grooves $d$ nearest the edge $a'$. Further, it may be employed as shown in Fig. 5—that is, with its recessed edge $a^2$ against the cutter-head $s$, the knife $r'$ projecting through recess $n$ and the knife $r$ being positioned by means of the graduations, as in the usual manner.

In some cutter-heads the knife-securing bolt and other projections extend so far from the cylinder or cutter-head that calculations must be made for them, as otherwise they would strike the work. It is for this reason that a plurality of the grooves $d$ or $d'$ is provided. In this manner it is possible to widen the device to meet the above circumstances and also to set knives having greater depth. The grooves are provided for both edges $a'$ and $a^2$ and permit the member $b$ to slide on the member $a$, so as to provide a measuring-gage of increased length.

As shown in Fig. 6, the invention may also be employed as a caliper to measure the thickness of an object $h$, the part $h$ being clamped between the abutment-shoulder $a^3$ and an edge of the member $b$.

Either abutment-shoulder $a^2$ may be positioned at either end of the graded member $b$, and in this way the knives on cylinders or cutters located in any position may be adjusted.

The two members are easily separated and connected and may be adjusted very quickly.

Having thus described my invention, what I claim, and desire to secure by Letters Patent, is—

1. In a gage for setting surface or molding knives, the combination of an approximately U-shaped member provided with graduations, ribs on the inner walls of the U-shaped member, and a member carrying an abutment-shoulder and provided with grooves on opposite sides, the ribs on the U-shaped member engaging the grooves in the other member.

2. The combination of the approximately U-shaped graded member, and a member having an abutment-shoulder, and an edge to be held against the cylinder or cutter-head, the U-shaped member engaging the other member on opposite sides.

3. The combination of the approximately U-shaped graded member, and a member having an abutment-shoulder, and an edge to be held against the cylinder or cutter-head, the U-shaped member engaging the other member on opposite sides and being adjustable thereon to and from the edge that engages the cylinder or cutter-head.

4. The combination of a member provided with a pair of edges to bear against the cylinder or cutter-head, one of said edges being recessed, an abutment-shoulder at one end of each edge, and a plurality of grooves on opposite sides adjacent each edge; and an approximately U-shaped member made of spring material, provided with ribs on its inner walls to enter grooves on opposite sides of the first-mentioned member, and having graduations.

In testimony whereof I affix my signature in presence of two witnesses.

GUSTAV B. WESTBURG.

Witnesses:
L. L. WESTFALL,
C. G. PIERCE.